(No Model.)
W. HASLUP.
Earth Scraper.
No. 234,982.        Patented Nov. 30, 1880.
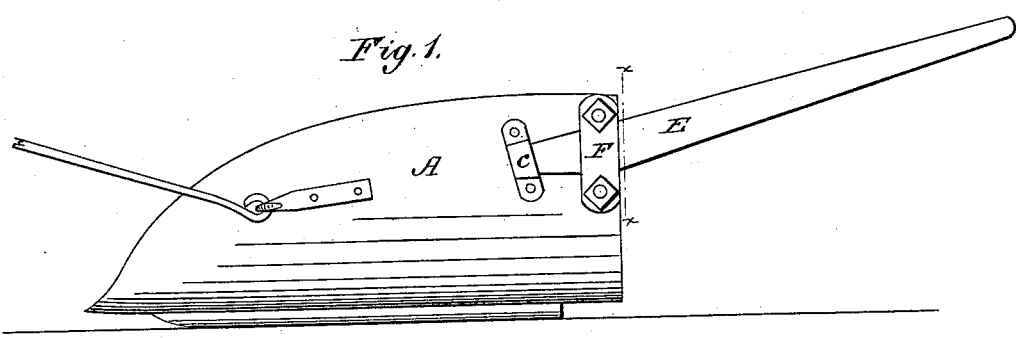
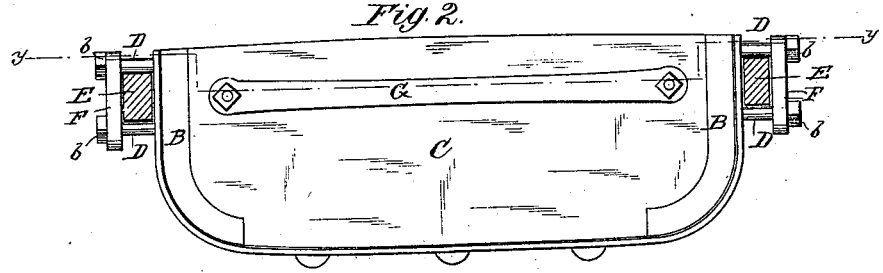
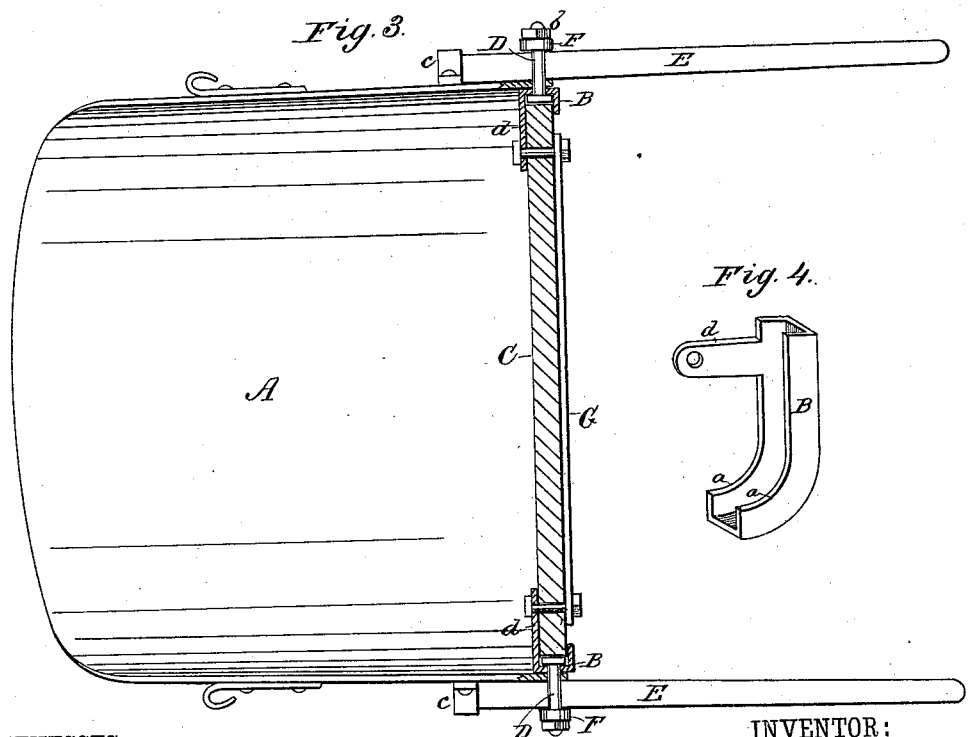
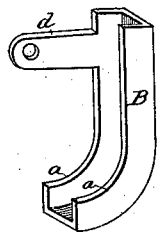
WITNESSES:
W. W. Hollingsworth
Edw. T. Byrn
INVENTOR:
Wm. Haslup
BY
ATTORNEYS.

UNITED STATES PATENT OFFICE.

WILLIAM HASLUP, OF SIDNEY, OHIO.

EARTH-SCRAPER.

SPECIFICATION forming part of Letters Patent No. 234,982, dated November 30, 1880.

Application filed October 27, 1880. (No model.)

*To all whom it may concern:*

Be it known that I, WILLIAM HASLUP, of Sidney, in the county of Shelby and State of Ohio, have invented a new and Improved Earth-Scraper; and I do hereby declare that the following is a full, clear, and exact description of the same, reference being had to the accompanying drawings, forming part of this specification, in which—

Figure 1 is a side elevation. Fig. 2 is a rear view, with the handles in section through line $x\ x$ of Fig. 1. Fig. 3 is a plan view, with the back-board in section through line $y\ y$ of Fig. 2. Fig. 4 is a detail, in perspective, of one of the socket-plates.

My invention relates to an improvement in steel earth-scrapers; and it consists in the means for detachably fastening the handles to the sides of the scraper, for which purpose curved and flanged socket-plates are arranged on the inner walls of the scraper to receive the ends of the back-board, between which socket-plates and a clamp-bar on the outside of the scraper the handles and side walls of the scraper are detachably clamped by two bolts, while the forward ends of the handles are held in rigid sockets on the sides of the scraper.

The invention also consists in constructing the socket-plates with a lug which extends along the side of the back-board, and arranging on the opposite side of the back-board from said lugs a tie-bar, whose ends are bolted through the back-board to the said lugs, so as to prevent the socket-plates and sides of the scraper from spreading out and releasing the ends of the back-board, as hereinafter more fully described.

In the drawings, A represents the body of the scraper, which is made of sheet-steel and turned up at the sides.

B B are the socket-plates, which are curved on their outer edges to correspond with the curve of the side walls of the scraper, and provided with two flanges, $a\ a$, Fig. 4, which project inwardly and form a socket to receive the ends of the wooden back-board C.

D D are two bolts, whose heads are arranged in the groove of the socket-plate near the top, and whose shanks extend through the socket-plate and the side walls of the scraper, and project on the outside a sufficient distance to receive the handles E between them, which handles are firmly held by a clamp-plate, F, whose perforated ends are slipped over the two bolts and the plate clamped against the handles by nuts $b\ b$. To insure stiffness in the handles their forward ends are seated in sockets $c$, rigidly fixed to the outer sides of the scraper.

It will thus be seen that by the agency of the bolts and clamp-plate the socket-plate, the handles, and the intermediate wall of the scraper are firmly clamped together, but in such a manner as to permit these parts to be readily detached when desired. The socket-plates, with their flanges, also prevent the ends of the back-board from splitting.

To prevent the side walls of the scraper from spreading outwardly and releasing the ends of the back-board from the socket-plates, I form on the inner flange of each of the socket-plates a perforated lug, $d$, and on the opposite side of the back-board I place a horizontal tie-bar, G, which extends from the lug $d$ on one side of the scraper to the lug $d$ on the other, and the ends of this tie-bar are firmly bolted through the back-board to these lugs, so as to hold the socket-plates and the side walls of the scraper firmly together against the ends of the back-board.

As shown, the lugs of the socket-plates are arranged upon the inside and the tie-bar on the outside of the back-board. This, however, is not an essential feature, and their relation may be reversed, if desired.

Having thus described my invention, what I claim as new is—

1. The combination, with the back-board and side walls of a scraper, of a pair of socket-plates arranged inside the walls of the scraper, the bolts D D, clamp-plate F, and the handles, whereby the socket-plate, side walls, and handles are firmly clamped together, substantially as described.

2. The combination, with the back-board and side walls of a scraper, of a pair of socket-plates adapted to receive the ends of the back-board, and having lugs $d$, and a tie-bar arranged on the opposite side of the back-board and bolted through the same to the said lugs, to prevent the scraper from spreading, substantially as described.

WILLIAM HASLUP.

Witnesses:
W. D. DAVIES,
JOHN W. D. WYMAN.